United States Patent
Day

(10) Patent No.: US 12,529,737 B2
(45) Date of Patent: Jan. 20, 2026

(54) SYSTEMS AND METHODS FOR USING IMPROVED CONTRAST AGENT IN PERFORMING AND MRI

(71) Applicant: Ronald Day, Cottonwood Heights, UT (US)

(72) Inventor: Ronald Day, Cottonwood Heights, UT (US)

(73) Assignee: Ronald Day

( * ) Notice: Subject to any disclaimer, the term of this patent is extended or adjusted under 35 U.S.C. 154(b) by 779 days.

(21) Appl. No.: 16/363,933

(22) Filed: Mar. 25, 2019

(65) Prior Publication Data

US 2020/0371172 A1    Nov. 26, 2020

(51) Int. Cl.

| | |
|---|---|
| *G01R 33/28* | (2006.01) |
| *A61K 9/00* | (2006.01) |
| *A61K 49/10* | (2006.01) |
| *A61K 49/18* | (2006.01) |
| *A61M 1/16* | (2006.01) |
| *A61M 15/00* | (2006.01) |
| *A61M 25/01* | (2006.01) |
| *G01R 33/56* | (2006.01) |
| *A61M 25/09* | (2006.01) |

(52) U.S. Cl.
CPC .......... *G01R 33/281* (2013.01); *A61K 9/0019* (2013.01); *A61K 9/0073* (2013.01); *A61K 49/101* (2013.01); *A61K 49/1896* (2013.01); *A61M 1/16* (2013.01); *A61M 15/0086* (2013.01); *A61M 25/01* (2013.01); *G01R 33/5601* (2013.01); *A61M 2025/091* (2013.01); *A61M 2202/0275* (2013.01); *A61M 2210/0693* (2013.01)

(58) Field of Classification Search
None
See application file for complete search history.

(56) References Cited

U.S. PATENT DOCUMENTS

2014/0286921 A1 * 9/2014 Zapol ..................... A61K 33/00
424/93.73

OTHER PUBLICATIONS

Day et al. Nitric oxide increases the signal intensity of the T1-weighted magnetic resonance image of blood. 2005 J. Cardiovasc. Magn. Reson. 7: 667-669. (Year: 2005).*

* cited by examiner

*Primary Examiner* — Jennifer Chin
(74) *Attorney, Agent, or Firm* — Dax D. Anderson; Kirton McConkie

(57) ABSTRACT

The present invention relates to the use of a formation agent, such as nitric oxide or sodium nitrite to produce methemoglobin as an alternative MRI contrast agent. The formation agent can be infused using either a respiratory system or a delivery mechanism. One embodiment of this invention relates to systems and methods for producing an image of an internal region with a magnetic resonance scanning system. Blood is drawn from the patient. The blood is exposed to formation agent through a delivery system, to produce blood that has a higher saturation of methemoglobin. Where in vitro techniques are used the treated blood is injected back into the patient. The patient is scanned in the magnetic resonance scanner. These systems and methods can be used to produce images of regions which may not otherwise be possible with other contrasting agents. For example, an accurate vascular brain MRI may not be as informative if the patient is injected with an existing contrasting agent. In addition, an alternate embodiment of the invention relates to internally exposing the blood to the formation agent by placing the gas-permeable membrane along a particular blood pathway or intravenous sodium nitrite.

11 Claims, 4 Drawing Sheets

SYSTEMS AND METHODS FOR USING IMPROVED CONTRAST AGENT IN PERFORMING AND MRI

BACKGROUND

1. Field of the Invention

The present invention relates to treating blood with a formation agent to provide an improved MRI contrast agent. Specifically, a gaseous formation agent is infused into blood, either naturally through inhalation, or through artificially through a delivery mechanism. More particularly, the present invention relates to the use an autologous exchange transfusion or an autologous interchange transfusion of a discrete sample of blood or blood product to use nitric oxide or sodium nitrite to produce methemoglobin, an MRI contrast agent.

2. Background of the Invention and Related Art

Magnetic resonance scanners are commonly used in the medical industry to create magnetic resonance images (MRI). Magnetic resonance scanners utilize a combination of magnetic fields and radio waves to generate an image of an internal region. A very powerful magnetic field is generated around a patient by the scanner. The patient is typically positioned in a tube or shaft in which they are surrounded by the magnet. The scanner simultaneously transmits radio wave pulses of energy. Certain hydrogen atoms within the human body will then respond by releasing stored energy from the radio waves. The characteristics of this released energy can then be used to create an image of a particular two dimensional slice of tissue. This two dimensional slice can be oriented in any three dimensional configuration. In addition, the two dimensional images can be compiled to create three dimensional images of internal regions.

One of the limitations of MRI images is that certain fluids and tissue cannot easily be distinguished from surrounding fluid and tissue. Therefore, various contrasting agents have been developed to increase the contrast of MRI images such that they can be used to view particular internal items. One of the most common contrasting agents is gadolinium. Unfortunately, gadolinium has occasional or some problems. These problems include the propensity to leak across a vascular wall limiting the ability to properly image a vascular system. In addition, gadolinium does not quickly dissipate from a patient's body and may cause problems with imaging when serial scans must be performed during a short period of time. Some individuals experience allergic or adverse reactions to gadolinium. It is unclear whether long-term retention of gadolinium in some tissues may cause late adverse effects, even when allergic or adverse reactions are not immediately observed.

The Minimax Plus Oxygenation Systems by Medtronic or the extracorporeal membrane oxygenation (ECMO) are devices that diffuse gas into blood. However, large amounts of blood are required to operate these machines, and small aliquots of blood necessary to provide an image are not practicable.

Accordingly, there is a need in the industry for alternative contrast agents acquired through treating an aliquot of blood or blood product which can be administered as a bolus that affect MRI contrast but which do not necessarily contain the problems with gadolinium.

SUMMARY OF THE INVENTION

The present invention relates to systems and methods for forming methemoglobin in a patient's blood as an improved Magnetic Resonance Imaging (MRI) contrast agent. In some embodiments the use of nitric oxide to produce methemoglobin which is an alternative blood MRI contrast agent. In some embodiments the use of sodium nitrite to produce methemoglobin which is an alternative blood MRI contrast agent. One embodiment of this invention relates to a method for producing an image of an internal region with a magnetic resonance scanning system using methemoglobin as a contrast agent. Blood is drawn from the patient. The blood is exposed to a formation agent, such as nitric oxide with a gas-permeable membrane filter, or direct exposure to sodium nitrite, to produce blood that has a higher concentration of methemoglobin. In some embodiments the exposure is done in vitro. The treated blood is injected back into the patient, while the patient is being scanned in the magnetic resonance scanner. In some embodiments the exposure is done in vivo wherein the blood of the patient is exposed to nitric oxide through a gas-permeable catheter, or through the lung by inhalation, while being scanned in the magnetic resonance scanner. This method can be used to produce images of regions which may not otherwise be distinguishable with other contrasting agents. For example, an accurate vascular brain MRI may not be as informative if the patient is injected with an existing contrasting agent. In addition, an alternative embodiment of the invention relates to internally exposing the blood to nitric oxide by placing the gas-permeable membrane along a particular blood pathway.

In some embodiments the system comprises a diffusion system comprising a blood receiving chamber, a gas chamber wherein the blood chamber is separated from the gas chamber by a gas-permeable membrane. The gas chamber is filled with a forming agent such as nitric oxide which can diffuse through the gas-permeable membrane into the blood in the blood receiving chamber.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
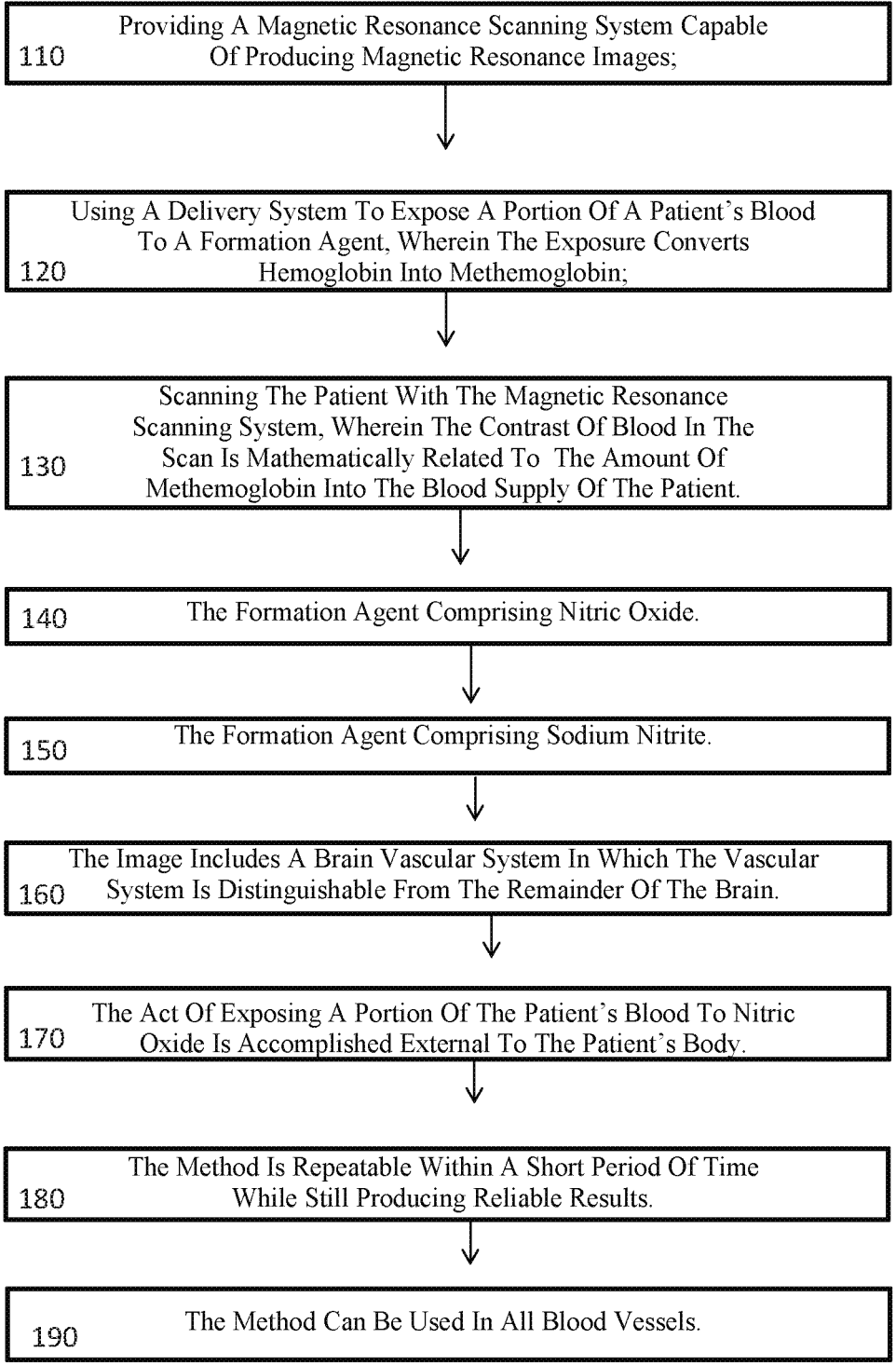
FIG. 1 illustrates a Providing a magnetic resonance scanning system capable of producing magnetic resonance images.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Methemoglobin level is expressed as the percentage of hemoglobin in the methemoglobin state (MetHb/Hb). Methemoglobin naturally occurs in a healthy individual at levels of 0% to 2%. In some embodiments methemoglobin levels are raised to levels necessary to allow effective imaging without causing toxicity. In some embodiments the methemoglobin level in an individual is raised to greater than normal. In some embodiments the methemoglobin is raised to 10% to 12%.

In some embodiments the hemoglobin level in an aliquot of blood or blood product is raised outside the individual, and then aliquot is injected into the individual so the methemoglobin levels will be locally higher, and then be reduced as the aliquot is mixed through the system. In some embodiments the methemoglobin level in the aliquot of blood is saturated to its maximum saturation level. In some embodiments the aliquot may be very small, such as less than 5 cc. In some embodiments the aliquot may be much larger, greater than 50 cc's. The aliquot volume will depend on the patient's blood volume, weight, or health. In addition, the size of the aliquot will depend on the image required, the flow of blood through the area being imaged and the quality of the image being obtained. In some embodiments an oximeter is used to non-invasively monitor the methemoglobin saturation levels. In some embodiments a reduction agent is used to reduce methemoglobin saturation levels before and after scanning is complete. In some embodiments ascorbic acid is used to reduce methemoglobin saturation levels. In some embodiments methylene blue is used to reduce methemoglobin saturation levels.

The present invention relates to exposing a patient's blood to a formation agent to form methemoglobin to produce an alternative blood MRI contrast agent. In some embodiments the formation agent is the gas nitric oxide. In some embodiments the formation agent is sodium nitrite. One embodiment of this invention relates to a method for producing an image of an internal region with a magnetic resonance scanning system. Blood is drawn from the patient. In some embodiments the blood is exposed to the formation agent, to produce blood that has a higher concentration of methemoglobin. In some in vitro embodiments the treated blood is injected back into the patient, while the patient is scanned in the magnetic resonance scanner. This method can be used to produce images of regions which may not otherwise be distinguishable with other contrasting agents. For example, an accurate vascular brain MRI may not be as informative if the patient is injected with an existing contrasting agent. In some embodiments the circulatory system may be imaged to determine whether vessels enhance a brain tumor. In addition, an alternative embodiment of the invention relates to internally exposing the blood to nitric oxide by placing the gas-permeable membrane or catheter along a particular blood pathway. While embodiments of the present invention are directed at the use of methemoglobin as a MRI contrast agent, it will be appreciated that the teachings of the present invention are applicable to other areas.

Reference is initially made to FIG. 1, which illustrates a flow chart of a method of producing an image in accordance with one embodiment of the present invention, designated generally at 100. The method includes providing a magnetic resonance scanning system, act 105. A patient's blood is then exposed to a formation agent. In some embodiments the formation agent is a nitric oxide gas via some form of gas-permeable membrane or filter, act 110. In some embodiments the formation agent is an intravenous infusion of sodium nitrite. Various exposure techniques may be used including both external and internal to the patient's body. The exposure of the patient's blood to the formation agent causes a portion of the patient's hemoglobin to be converted to methemoglobin in an amount proportional to the amount of nitric oxide exposure. This conversion is significant because the presence of methemoglobin may adequately improve the contrasting properties of blood within the human body. The patient is then scanned with the magnetic resonance scanning system, 115. The scan can be used to produce an image of a particular two dimensional slice of the human body. The method described above can be repeated within a short period of time and still produce reliable results. Methemoglobin does not pass through the blood-brain barrier, the blood vessel wall or other blood-tissue barriers unless there is a vascular injury. Therefore, the method described above can be used to effectively identify cerebral vascular injuries. In some embodiments methemoglobin assists in identifying a lack of vessel integrity in the brain. Intracellular methemoglobin has the ability to identify bleeding or a lack of vessel integrity anywhere in the body.

In some embodiments the blood is treated in vivo. In some embodiments the nitric oxide is diffused into the blood using the patient's biological processes. In some embodiments a formation agent such as nitric oxide gas is inhaled and diffused into the blood through internal membranes. In some embodiments this exposure to the formation agent causes methemoglobin to form in the blood. As a result, the time required to achieve the desired saturation level is limited by the amount of formation agent the patient can safely inhale. In some embodiments the amount of nitric oxide administered is controlled to achieve the desired saturation levels.

In some embodiments the delivery system comprises in vitro exposing blood to the formation agent, such as nitric oxide in vitro using a delivery system 5. In some embodiments the system comprises a diffusion system comprising a blood chamber 10, a gas chamber 15 wherein the blood chamber is separated from the gas chamber by a gas-permeable membrane 20. In some embodiments the gas chamber 15 is filled with a gas, such as nitric oxide, through a gas inline 25. In some embodiments the delivery system 5 comprises a blood receiving chamber 10 comprised to receive a specimen of blood. In some embodiments the blood receiving chamber 10 comprises a syringe. The blood may be kept in the blood receiving chamber 10 until the desired saturation level is achieved then the blood is injected into the patient to produce a bolus of contrast agent.

In some embodiments the gas-permeable membrane 20 in the delivery system 10 comprises a gas-permeable membrane. In some embodiments the syringe wall is a membrane 20. In some embodiments the syringe wall comprises a support framework with holes or slits allowing the membrane direct contact with the blood or blood product. In some embodiments gas from the gas chamber diffuses from the gas chamber, across the gas-permeable membrane 20. In some embodiments the formation agent gas passes through the membrane 20, enters the blood sample in the blood receiving chamber 10 wherein the gas reacts with the hemoglobin to form methemoglobin. In some embodiments the membrane 20 comprises a portion of the blood chamber 10 wall, allowing the user to view the blood sample as the gas diffuses into the blood sample. In some embodiments the membrane 20 comprises at least a portion of the blood chamber wall.

In some embodiments the blood receiving chamber comprises an inlet 30 connected directly to the patient through which blood is withdrawn from and returned to the patient. In some embodiments the blood receiving chamber comprises separate cannulas, a first cannula configured to withdraw the blood and a second cannula configured to return the blood. In some embodiments the in vitro blood treatment technique is best to observe the circulatory system. In some embodiments the blood is exposed to the gas-permeable membrane until the desired methemoglobin saturation level is achieved. In some embodiments the extracted blood, once saturated as desired, is injected back into the patient.

Some embodiments of the invention relate to internally exposing the blood to nitric oxide by placing the gas-permeable membrane or catheter along a particular blood pathway. In some embodiments the gas is delivered intravenously through a catheter sized to diffuse the gas into the blood wherein the catheter is placed in the vein and configured to release the formation agent into the blood stream, treating the blood with the gas to form methemoglobin. In some embodiments as a gas-permeable catheter, such polydimethylsiloxane is inserted into the vein which exposes the blood to the formation agent causing the formation of methemoglobin.

In some embodiments in vivo treatments are used to form methemoglobin. In some embodiments blood is exposed to an infusion of sodium nitrite intravenously. In some embodiments blood perfusion of the heart can be observed by administering a bolus to the patient and scanning to see how the muscle takes up the contrast agent. In some embodiments where the total image of the standard circulation is desired the sodium nitrite infusion or nitric oxide through a catheter may be used to load the system with the desired amount of formation agent.

Disclosed herein are a variety of methods and systems for practicing the invention. These methods disclose steps, however it will be understood that the steps in the methods can be performed in varying orders and some steps can be skipped. A method for producing an internal image 100. Some embodiments comprise providing a magnetic resonance scanning system capable of producing magnetic resonance images 110. Some embodiments comprise using a delivery system to expose a portion of a patient's blood to a formation agent, wherein the exposure converts hemoglobin into methemoglobin 120. Some embodiments comprise scanning the patient with the magnetic resonance scanning system, wherein the contrast of blood in the scan is mathematically related to the amount of methemoglobin into the blood supply of the patient. 130 Some embodiments comprise the formation agent comprising nitric oxide. 140 Some embodiments comprise the formation agent comprising sodium nitrite. 150 Some embodiments comprise the image includes a brain vascular system in which the vascular system is distinguishable from the remainder of the brain. 160 Some embodiments comprise the act of exposing a portion of the patient's blood to nitric oxide is accomplished external to the patient's body. 170 Some embodiments comprise the method is repeatable within a short period of time while still producing reliable results. 180 Some embodiments comprise the method can be used in all blood vessels. 190

Figure 2:
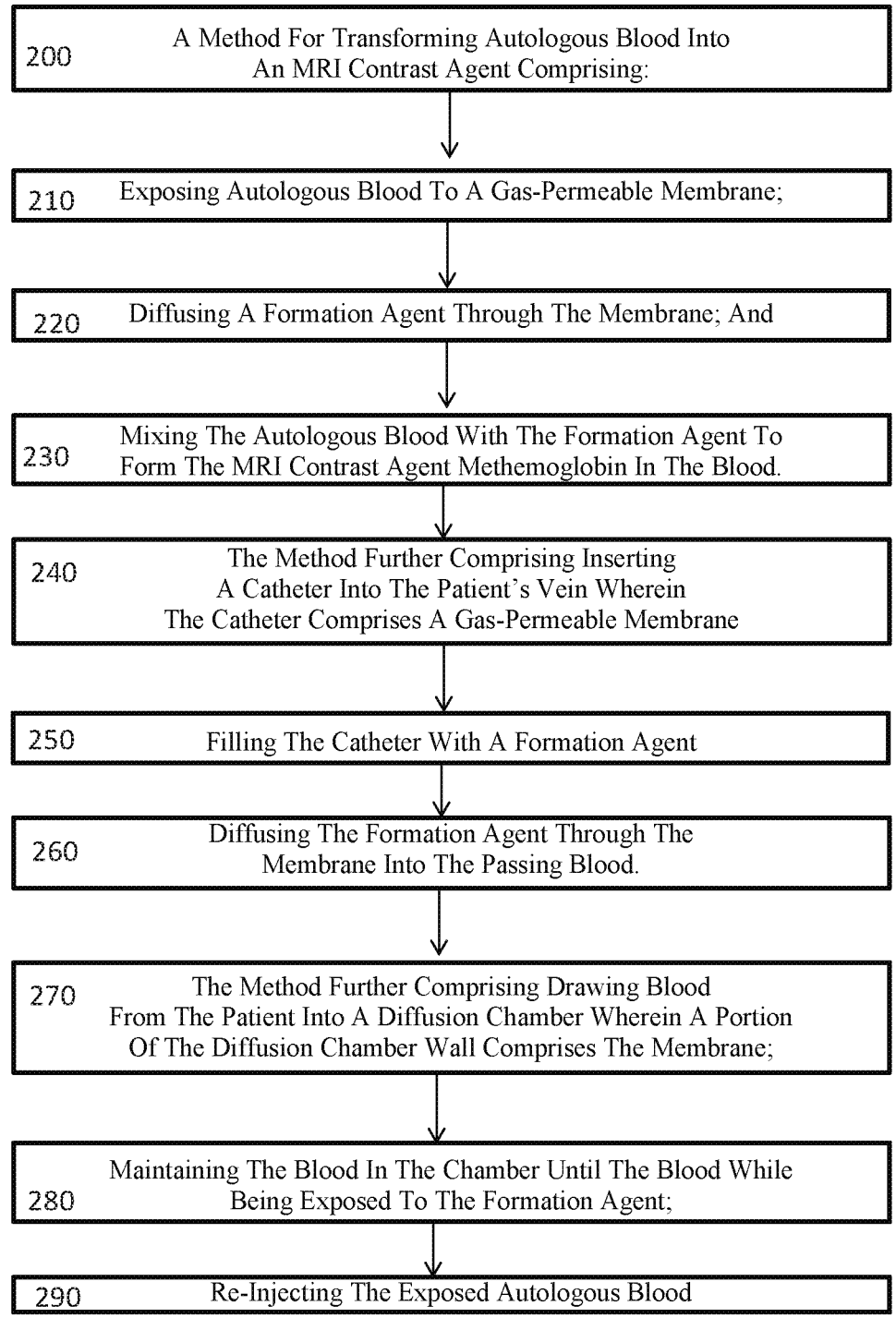
FIG. 2 illustrates a method for transforming autologous blood into an MRI contrast agent comprising.

Referring now to FIG. 2, some embodiments comprise a method for transforming autologous blood into an MRI contrast agent. 200 Some embodiments comprise exposing autologous blood to a gas-permeable membrane. 210 Some embodiments comprise diffusing a formation agent through the membrane. 220 Some embodiments comprise mixing the autologous blood with the formation agent to form the MRI contrast agent methemoglobin in the blood. 230 Some embodiments further comprising inserting a catheter into the patient's vein wherein the catheter comprises a gas-permeable membrane. 240 Some embodiments comprise filling the catheter with a formation agent. 250. Some embodiments comprise diffusing the formation agent through the membrane into the passing blood. 260 Some embodiments further comprising drawing blood from the patient into a diffusion chamber wherein a portion of the diffusion chamber wall comprises the membrane. 270 Some embodiments comprise maintaining the blood in the chamber until the blood while being exposed to the formation agent. 280 Some embodiments comprise re-injecting the exposed autologous blood. 290

Figure 3:
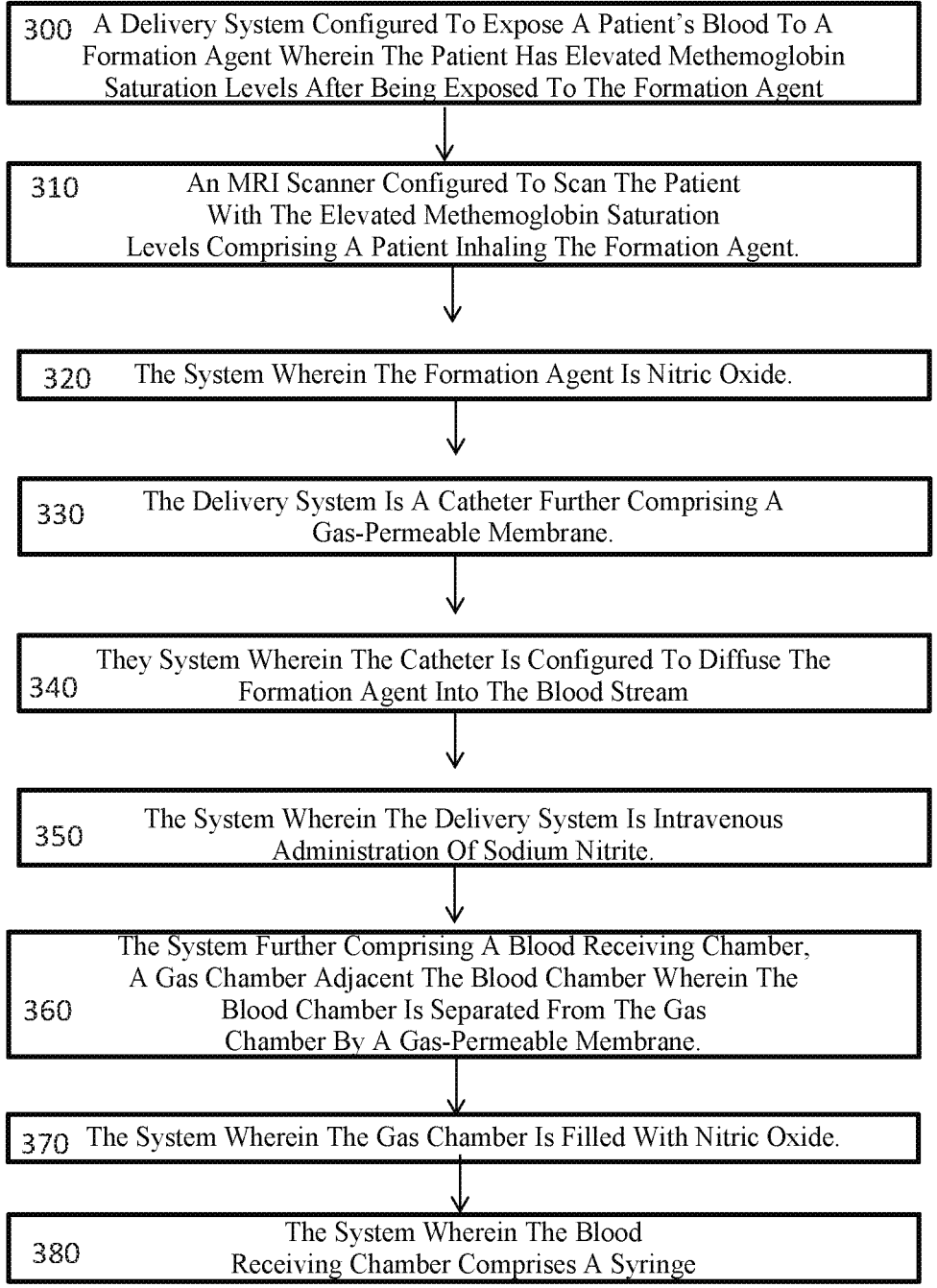
FIG. 3 illustrates a delivery system configured to expose a patient's blood to a formation agent wherein the patient has elevated methemoglobin saturation levels after being exposed to the formation agent.

Referring now to FIG. 3, some embodiments comprise a delivery system configured to expose a patient's blood to a formation agent wherein the patient has elevated methemoglobin saturation levels after being exposed to the formation agent. 300 Some embodiments comprise an MRI scanner configured to scan the patient with the elevated methemoglobin saturation levels comprising a patient inhaling the formation agent. 310 Some embodiments comprise the system wherein the formation agent is nitric oxide. 320 Some embodiments comprise the delivery system is a catheter further comprising a gas-permeable membrane. 330 Some embodiments comprise they system wherein the catheter is configured to diffuse the formation agent into the blood stream. 340 Some embodiments comprise the system wherein the delivery system is intravenous administration of sodium nitrite. 350 Some embodiments further comprise a blood receiving chamber, a gas chamber adjacent the blood chamber wherein the blood chamber is separated from the gas chamber by a gas-permeable membrane. 360 Some embodiments comprise the system wherein the gas chamber is filled with nitric oxide. 370 Some embodiments comprise the system wherein the blood receiving chamber comprises a syringe. 380

Figure 4:
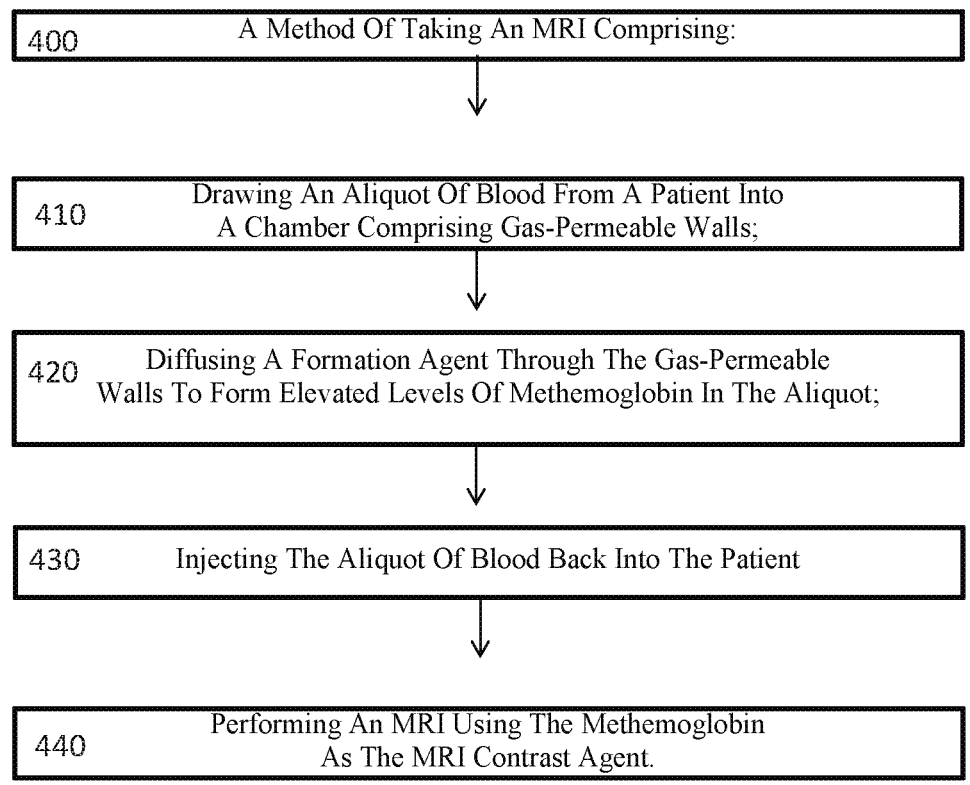
FIG. 4 illustrates a method of taking an MRI using methemoglobin

Referring now to FIG. 4, some embodiments comprise a method of taking an MRI. 400 Some embodiments comprise drawing an aliquot of blood from a patient into a chamber comprising gas-permeable walls. 410 Some embodiments comprise diffusing a formation agent through the gas-permeable walls to form elevated levels of methemoglobin in the aliquot. 420 Some embodiments comprise injecting the aliquot of blood back into the patient. 430 Some embodiments comprise performing an MRI using the methemoglobin as the MRI contrast agent. 440

Thus, as discussed herein, the embodiments of the present invention relate to the use of nitric oxide or sodium nitrite to produce an alternate MRI contrast agent. The present invention may be embodied in other specific forms without departing from its spirit or essential characteristics. The described embodiments are to be considered in all respects

What is claimed and desired to be secured by Letters Patent is:

1. A method of transforming blood of a patient into an MRI contrast agent comprising:
   exposing the blood to a gas-permeable membrane;
   diffusing nitric oxide through the gas-permeable membrane;
   treating the blood with the nitric oxide to form an MRI contrast agent comprising methemoglobin in the blood;
   determining whether a desired methemoglobin saturation level is achieved in the blood;
   responsive to determining that the desired methemoglobin saturation level is achieved, performing an MRI using the MRI contrast agent; and
   treating the blood with a reduction agent to reduce the desired methemoglobin saturation level either before or after MRI scanning is complete.

2. The method of claim 1 wherein treating the blood with the nitric oxide comprises:
   inserting a catheter comprising the gas-permeable membrane into a blood pathway of the patient;
   filling the catheter with the nitric oxide; and
   diffusing, in vivo, the nitric oxide through the gas-permeable membrane into the blood of the blood pathway.

3. The method of claim 1, wherein treating the blood with nitric oxide comprises:
   drawing blood from the patient into a diffusion chamber wherein a portion of the diffusion chamber wall comprises the gas-permeable membrane;
   exposing, in vitro, the blood in the chamber to the nitric oxide; and
   re-injecting the exposed blood into the patient.

4. A method for transforming blood into an MRI contrast agent comprising:
   treating blood of a patient with sodium nitrite for MRI contrast agent methemoglobin in the blood of the patient;
   determining whether a desired methemoglobin saturation level is achieved in the blood of the patient;
   treating the blood with a reduction agent to reduce the desired methemoglobin saturation level either before or after MRI scanning is complete; and
   responsive to determining that the desired methemoglobin saturation level is achieved, performing an MRI using the MRI contrast agent.

5. The method of claim 4 wherein treating the blood of the patient with sodium nitrite comprises:
   inserting a catheter into a blood vessel of the patient;
   infusing, in vivo, the sodium nitrite into the blood of the patient via the catheter.

6. The method of claim 4, wherein treating the blood of the patient with sodium nitrite comprises:
   drawing blood from the patient into a chamber;
   exposing, in vitro, the blood in the chamber to a solution of sodium nitrite; and
   re-injecting the exposed blood into the patient.

7. The method of claim 6, further comprising repeatedly re-injecting the exposed blood into the patient until the desired methemoglobin saturation level is achieved.

8. The method of claim 6, further comprising:
   determining whether a desired methemoglobin saturation level in the chamber is achieved;
   responsive to determining that the desired methemoglobin saturation level in the chamber is achieved, re-injecting blood from the chamber back into the patient; and
   performing an MRI angiogram using the methemoglobin as the MRI contrast agent to image the flow of blood with contrast through an organ of the patient.

9. A method for using an autologous exchange transfusion or an autologous interchange transfusion of a discrete sample of blood or blood product to form an MRI contrast agent comprising:
   mixing the blood product with a formation agent comprising nitric oxide or sodium nitrite to produce an MRI contrast agent comprising methemoglobin in the blood product;
   treating the blood with a reduction agent to reduce the desired methemoglobin saturation level either before or after MRI scanning is complete;
   performing an MRI using the produced methemoglobin as the contrast agent; and
   detecting a lack of blood vessel integrity or internal bleeding responsive to an analysis of one or more MRI images depicting the produced methemoglobin.

10. The method of claim 9, wherein mixing the blood product with the formation agent comprises:
    exposing the blood product to a gas-permeable membrane; and
    diffusing the nitric oxide through the membrane.

11. The method of claim 9, wherein mixing the blood product with the formation agent comprises infusing a solution of sodium nitrite into the blood product.

* * * * *